July 3, 1962 V. RONKA 3,042,857
ELECTROMAGNETIC PROSPECTING APPARATUS
Filed Dec. 14, 1959 2 Sheets-Sheet 1
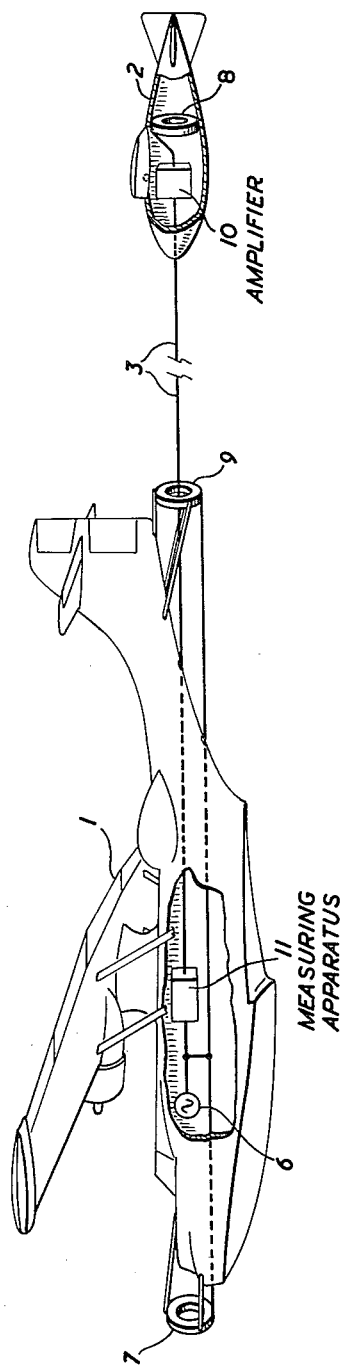
FIG. I
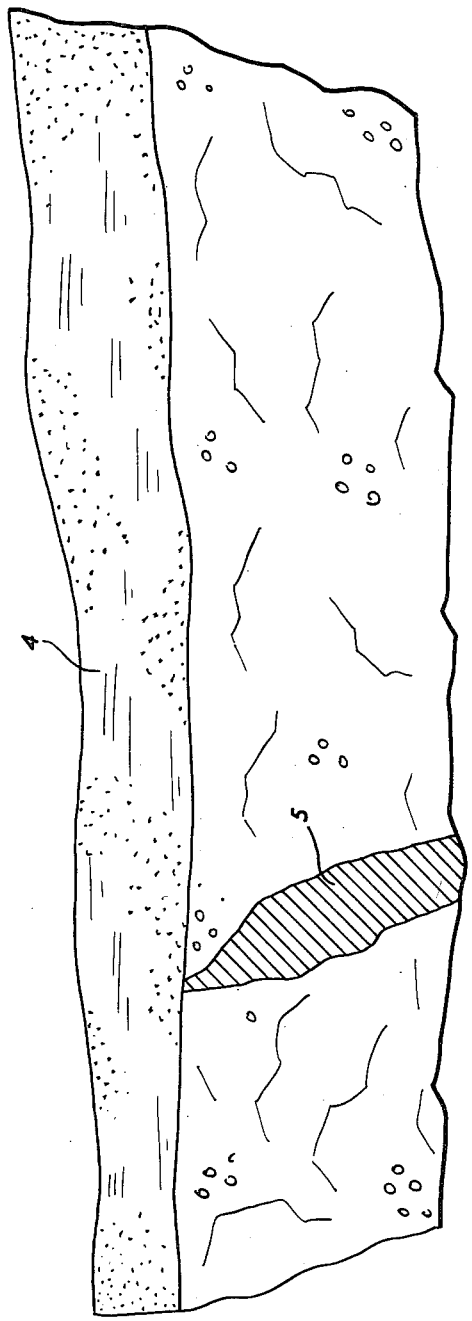
INVENTOR
VAINO RONKA
BY Maybee & Legris
ATTORNEYS

INVENTOR
VAINO RONKA

United States Patent Office 3,042,857
Patented July 3, 1962.

3,042,857
ELECTROMAGNETIC PROSPECTING APPARATUS
Vaino Ronka, 69 Hurlingham Crescent, Don Mills,
Toronto, Ontario, Canada
Filed Dec. 14, 1959, Ser. No. 859,374
28 Claims. (Cl. 324—4)

This invention relates to an apparatus for geophysical prospecting using electromagnetic fields.

In electromagnetic prospecting it is known to transmit an alternating primary electromagnetic field from one point, thus causing a secondary electromagnetic field due to anomalies (for example, conductive ores, water, salt water beds and other conductive bodies or formations) in the earth, and to sense the resultant field at a second point spaced from the first. Commonly the first point is the centre of a transmitting coil in an aircraft and the second point is the centre of a receiving coil or coils in a bird towed by the aircraft. The primary field strength at the second point or receiver usually varies inversely with the third power of the distance from the first point or transmitter, so that a very small change in the distance between these points (such as might be caused by stretching or bending of a tow cable or by thermal expansion of a structure supporting both the transmitter and the receiver) may cause an appreciable change in the strength of the primary field at the receiver, whereas for accurate measurement of the variations in the secondary field it is important that the primary field at the receiver appear to be constant.

It is an object of the invention to reduce or eliminate the disturbing effects of small changes of distance between the transmitter and receiver.

A transmitting coil may be considered as having a dipole vector oriented along the coil axis. The position of a receiver, particularly of a receiver in a towed bird, may move angularly with respect to the transmitting dipole vector, and such angular movements also cause changes in the primary field strength at the receiving point.

It is another object of the invention to reduce errors caused by small angular movements between the transmitter and receiver.

According to the invention the transmitter signal as sensed by the receiver is opposed by a signal that changes in substantially the same way as the transmitter signal, the difference between these signals thus being substantially constant, for small changes in relative positions between the transmitter and the receiver, so that such changes do not cause appreciable errors in measurement of the secondary field.

Preferred embodiments of the invention as applied to aerial prospecting will now be described with reference to the accompanying drawings in which:

FIG. 1 is a diagrammatic view of an aircraft and towed bird carrying prospecting apparatus and flying over terrain in which there is a conductive ore body;

Figure 2:
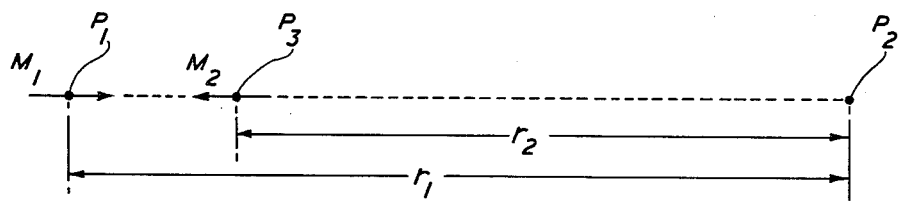
FIG. 2 is a diagram illustrating some of the vectorial and spatial relationships of the apparatus of FIG. 1.

In FIG. 1 an aircraft 1 is shown towing a bird 2 by means of a tow cable 3. In the terrain below, under the overburden 4, is a steeply dipping conductive ore body 5. Within the aircraft an alternating current generator 6, operating at, say, one thousand cycles per second, energizes a transmitting coil 7 mounted at the front of the aircraft and having a horizontal axis. The coil 7 sets up a primary electromagnetic field which passes through both the ore body 5 and through a receiving coil 8 carried by the bird behind the coil 7. In the embodiment of the invention illustrated in FIG. 1 there is provided a second transmitting coil 9 carried at the rear of the aircraft and also energized by the generator 6 and setting up at the receiving coil 8 a compensating electromagnetic field the characteristics of which are described below. The primary field from the transmitter 7, modified by the field from the transmitter 9, causes eddy currents in the ore body 5 and these in turn set up a secondary electromagnetic field also passing through the receiving coil 8. Thus there is induced in the receiving coil 8 a first signal caused by the primary field from the transmitter 7, a second signal caused by the compensating field from the transmitter 9, and a third signal caused by the secondary field from the ore body. (These signals, and the fields causing them, of course, produce resultant or net signals or fields which are the signals or fields actually detected, but it is convenient to consider the individual signals and fields as separate parts of these observed resultants.) The sum of these signals is amplified by an amplifier 10 and carried along the tow cable 3 to measuring apparatus 11 in the aircraft. In the embodiment of the invention shown in FIG. 1 the bird is flown behind the aircraft with the axes of the coils 7, 8 and 9 in alignment.

If $M_1$ = magnetic moment of coil 7,
$M_2$ = magnetic moment of coil 9,
$r_1$ = distance from coil 7 to coil 8 (see FIG. 2),
$r_2$ = distance from coil 9 to coil 8,
$H_1$ = primary field strength due to coil 7 at coil 8,
$H_2$ = compensating field strength due to coil 9 at coil 8,
$N$ = number of turns of coil 8,
$V_1$ = voltage induced in coil 8 by the field $H_1$, and
$V_2$ = voltage induced in coil 8 by the field $H_2$, then $H_1 = C_1 M_1 r_1^{-3}$
$H_2 = C_2 M_2 r_2^{-3}$
$V_1 = KNH_1$
$V_2 = KNH_2$ where $C_1$, $C_2$ and $K$ are constants.

In FIG. 2 the magnetic moments $M_1$ and $M_2$ are shown as dipole vectors, and these extend along the axes of the coils 7 and 9, the centres of the coils being designated as $P_1$ for coil 7, $P_2$ for coil 8, and $P_3$ for coil 9. As long as $P_2$ is a long distance from both $P_1$ and $P_3$, with $M_1$ and $M_2$ parallel but in opposite directions, $C_1$ and $C_2$ are equal and $H_1$ and $H_2$ are in opposite directions, and $H_1$ and $H_2$ are clearly in opposite directions with the arrangement of FIGS. 1 and 2.

Since $V_1$ is proportional to $H_1$, a small change in $r_1$ will cause a comparatively large change in both $H_1$ and $V_1$, and this comparatively large change in $V_1$ could cause the measuring apparatus 11 to indicate falsely an apparent anomaly, or it could interfere with the accurate detection of the secondary field from the true anomaly 5.

If, however, $H_2$ and $H_1$ are in opposite directions, $V_2$ opposes $V_1$, and if both $V_2$ and $V_1$ can be made to change by the same amount with a change in $r_1$ the error or false indication can be eliminated. If $r_1$ and $r_2$ are large compared to the difference between them, a change in $r_1$ is accompanied by a substantially equal change in $r_2$; if the change in $r_1$ is due solely to stretching of the tow cable 3, the changes in $r_1$ and $r_2$ are identical. For the changes in $V_1$ and $V_2$ to be equal, since $V_1$ and $V_2$ are proportional to $H_1$ and $H_2$ respectively, the requirement is that the gradient of the field $H_1$ at the receiving coil be cancelled by the gradient of the field $H_2$, i.e., $$\frac{dH_1}{dr_1} = -\frac{dH_2}{dr_2}$$

$$-3C_1M_1r_1^{-4} = 3C_2M_2r_2^{-4}$$

$$-H_1r_1^{-1} = H_2r_2^{-1}$$

$$\frac{H_2}{H_1} = -\frac{r_2}{r_1}$$

$$\frac{V_2}{V_1} = -\frac{r_2}{r_1}$$

Thus, from the second of the above equations, the compensating coil 9 should be designed to have a magnetic moment $$M_2 = -\frac{C_1r_2^4}{C_2r_1^4}M_1$$

and since $C_1$ and $C_2$ are equal $$M_2 = -\frac{r_2^4}{r_1^4}M_1$$

With the compensating coil 9 designed to have a magnetic moment fulfilling this relationship, small changes in $r_1$ have no effect on the signal sent by the receiving coil 8 to the measuring apparatus 11, and fluctuations in this signal can therefore be analyzed in the conventional way by the apparatus 11 to indicate anomalies in the earth over which the apparatus passes. Of course, the field from the compensating coil 9 reduces the effective strength of the primary field from the transmitter 7, but the increased accuracy obtainable justifies this loss.

In a practical case, for example, $$r_2 = 0.8r_1$$
$$H_2 = -0.8H_1$$

and the primary field $H_1$ and the compensating field $H_2$ at the receiving coil produce in the result a field of strength $$H_1 + H_2 = 0.2H_1$$

In an ore body, which will be nearly the same distance from the transmitting coil 7 and the compensating coil 9, these coils will combine to produce a field of strength proportional to $$M_1 + M_2 = M_1 - \left(\frac{0.8r_1}{r_1}\right)^4 M_1 = 0.5904M_1$$

Figure 3:
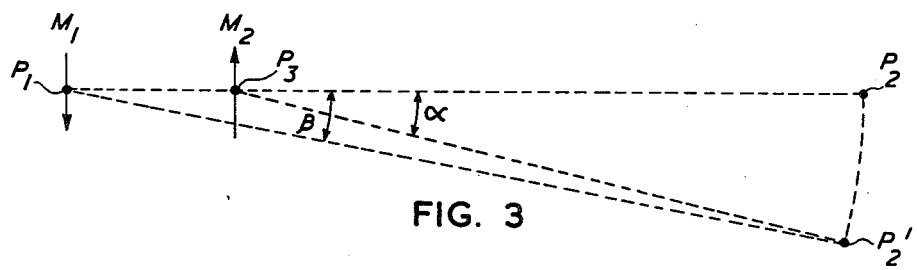
FIG. 3 is a diagram illustrating variations of the vectorial and spatial relationships.

Another practical arrangement, for which the foregoing relationships are equally applicable, is illustrated by FIG. 3, for which the coils 7 and 9 are arranged with their axes vertical so that the dipole vectors $M_1$ and $M_2$ are vertical but still, of course, in opposite directions. With this arrangement the receiving coil 8 at $P_2$ will normally be arranged with its axis vertical.

It is possible, especially where the receiving coil is in a bird, to have an angular movement of the receiver with respect to the transmitting dipole vector, and this is illustrated in FIG. 3 where the bird is assumed to have swung downwardly so that the receiving coil moves to point $P_2'$. Such an angular movement is less serious with the compensating coil in operation than it would be if the compensating coil were not used, since in FIG. 3 point $P_2'$ is, relative to point $P_2$, in a location where the fields due to both the transmitting coil 7 and the compensating coil 9 are stronger, and thus the increased signal in the receiving coil due to the primary field is offset by increased signal due to the compensating field. In FIG. 2 a similar downward movement of the receiving coil would subject the receiving coil to weaker primary and compensating fields. Angular movement has a more disturbing effect if, prior to the movement, the dipole vectors of the transmitting and compensating coils are neither aligned along the line joining $P_1$ and $P_2$ (as in FIG. 2) nor normal thereto (as in FIG. 3).

A further compensating effect comes into play with the arrangement of FIG. 3. If the tow cable is pivoted to the aircraft nearer the coil 9 than the coil 7, downward swinging of the bird decreases the distance $r_1$ while $r_2$ remains fairly constant, so that there is a tendency to increase the effect of the primary field $H_1$ compared to the compensating field $H_2$. However, at the same time the angle $\alpha$ of FIG. 3 increases more rapidly than the angle $\beta$, tending to increase the effect of the compensating field compared to the primary field. Or, if the tow cable is pivoted to the aircraft near the coil 7 than the coil 9, downward swinging of the bird increases the distance $r_2$ more rapidly than $r_1$, again tending to increase the effect of the primary field $H_1$, but this is again offset by the more rapid increase of angle $\alpha$ and angle $\beta$.

The arrangement of FIG. 3 gives best coupling to a steeply dipping ore body if the aircraft flies fairly low (for example, at three hundred feet above ground level), and has the advantage that the primary field can penetrate quite deeply into the earth so that secondary signals from small anomalies near the surface are not deceptively strong compared to the signals from major and important anomalies at greater depths. However, with the arrangement of FIG. 2 the aircraft may fly higher (for example, at five hundred feet above ground level) with the transmitting and receiving coils closer together (for example, four hundred feet apart) then in the case of FIG. 3 (where a distance $r_1$ of, for example, six hundred feet may be desirable).

It will be clear that the closer the point $P_2$ to points $P_1$ and $P_3$ the greater the likelihood of angular movements causing false signals in the receiver due to different changes in both $r_1$ and $r_2$ and in $\alpha$ and $\beta$, and it is therefore desirable that the distance between the transmitting coil 7 and the compensating coil 9 be small (for example, fifty feet) compared to the distance $r_1$ (which may be three or four hundred feet, for example).

Figure 4:
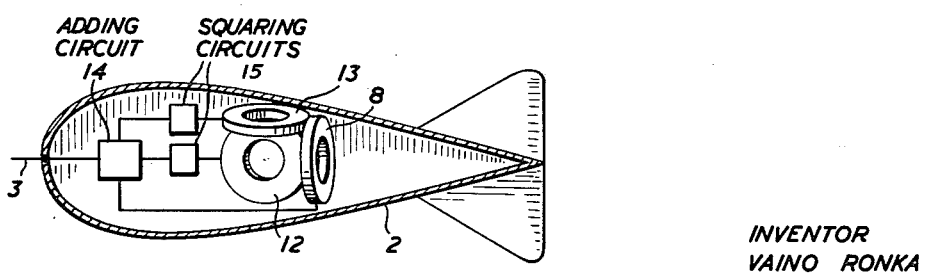
FIG. 4 is a diagrammatic view of a bird containing preferred receiver aparatus.

Because of the angular movement of the receiver 8 relative to the transmitting and compensating coils it is preferable to provide a receiver responsive to the total primary, secondary and compensating fields at point $P_2$ by means of three coils having mutually perpendicular axes in lieu of the single coil 8 that is sensitive to only one directional component of field. Such an arrangement is illustrated in FIG. 4 which shows, in the bird 2, the receiving coil 8 supplemented by receiving coils 12 and 13 which sense the field components at right angles to the axis of the coil 8. One of the receiving coils, for example coil 8, is preferably oriented to pick up the strongest component of the primary field and thus, often, the strongest component of the secondary field as well; with this arrangement the accuracy of measurement of the other two components is not as important as it is if the three receiving coils do not have this selected orientation. The signals from the coils 8, 12 and 13 are transmitted to the measuring apparatus 11 in any desired manner as for example by passing through an adding circuit 14 where the square root of the sum of the squares of the individual coil signals is taken, the resultant signal, amplified if necessary, being sent along tow cable 3. In a practical case, where the angular movements of the receiver are small (i.e., where $\alpha$ is less than, say, ten degrees), and where one directional component $H_x$ (measured by coil 8) of the net field H at the receiver (H being the resultant of the total primary, secondary and compensating fields) is large compared to the other components $H_y$ and $H_z$ (measured by coils 12 and 13 respectively), advantage may be taken of the approximation $$H = H_x + \frac{H_y^2}{2} + \frac{H_z^2}{2}$$

Thus the signals from the coils 12 and 13 may be squared in circuits 15 and then, in the circuit 14, be divided in half and added to the signal from the coil 8, the resultant signal passing through the tow cable to the measuring apparatus 11 in the aircraft.

A further advantage that may be taken of the compensating transmitting coil 9 is that, particularly at points between the coils 7 and 9, the field from the coil 9 tends to cancel the primary field, reducing eddy currents in metal parts of the aircraft and thus reducing disturbing electromagnetic fields set up by these metal parts. This advantage can probably be best realized if the coils 7 and 9 are near the fore and aft parts of the aircraft respectively, as in FIG. 1.

Figure 5:
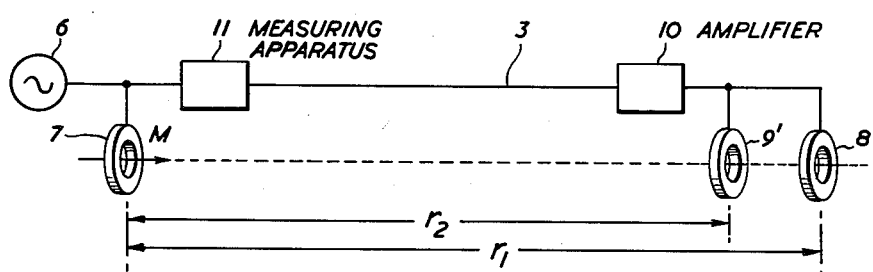
FIG. 5 is a diagram illustrating another arrangement of prospecting apparatus.

An alternative system that can be immune to distance variations is illustrated in FIG. 5. Here a single transmitting coil 7 is energized from the source 6, and the receiving coil 8 is supplemented by a compensating receiving coil 9', the signals from the coils 8 and 9' being fed in opposition through an amplifier 10 and cable 3 to measuring apparatus 11. The coils 7, 8 and 9' are shown arranged on a common horizontal axis, but as in the arrangement of FIG. 3 good results can be obtained with the axes vertical, and as in the arrangement of FIG. 4 each receiving coil can be replaced by three coils having mutually perpendicular axes.

If $M$ = magnetic moment of coil 7,
$r_1$ = distance from coil 7 to coil 8,
$r_2$ = distance from coil 7 to coil 9',
$H_1$ = primary field strength due to coil 7 at coil 8,
$H_2$ = primary field strength due to coil 7 at coil 9',
$N_1$ = number of turns of coil 8,
$N_2$ = number of turns of coil 9',
$V_1$ = voltage induced in coil 8 by the field $H_1$, and
$V_2$ = voltage induced in coil 9' by the field $H_2$, then $H_1 = CMr_1^{-3}$
$H_2 = CMr_2^{-3}$
$V_1 = K_1 N_1 H_1$
$V_2 = K_2 N_2 H_2$ where $C$, $K_1$ and $K_2$ are constants.

The output voltages $V_1$ and $V_2$ of the coils 8 and 9' are in direct opposition and will remain so as long as the axes of the coils 8 and 9' remain parallel and the distance between the coils is small compared to $r_1$ and $r_2$. Since a change in $r_1$ is substantially or identically equalled by a change in $r_2$, a change in $V_1$ due to a change in $r_1$ will be offset by an equal change in $V_2$ if $$\frac{dV_1}{dr_1} = -\frac{dV_2}{dr_2}$$

$$K_1 N_1 \frac{dH_1}{dr_1} = -K_2 N_2 \frac{dH_2}{dr_2}$$

$$-3K_1 N_1 C M r_1^{-4} = 3K_2 N_2 C M r_2^{-4}$$

$$-V_1 r_1^{-1} = V_2 r_2^{-1}$$

$$\frac{V_2}{V_1} = -\frac{r_2}{r_1}$$

The compensating coil should therefore be designed to satisfy this last relationship.

It is preferred to fly the bird 2 at the same elevation as the aircraft 1 since upward and downward movement of the bird relative to the aircraft is less likely with the bird directly behind the aircraft than with the bird at other elevations. One way of enabling the bird to be flown at the same elevation as the aircraft is to provide it with wings that are pivoted to have a variable and controllable angle of attack. However if the bird is flown at some other elevation than the aircraft, the coils 7, 8 and 9 or 7, 8 and 9' should preferably be arranged with their axes in substantially a vertical plane and all either substantially colinear or substantially normal to a line through their centers (which are the points $P_1$, $P_2$ and $P_3$ in FIG. 2).

The measuring apparatus 11 may be any of the types well known in the art and it need not therefore be described in detail. It is preferred to use an apparatus 11 which analyzes the net field at the receiver by recording separately its real and quadrature (imaginary) components.

While several ways of carrying out the invention have been described it is to be understood that the foregoing description is by way of illustration only, and that such modifications of apparatus as fall within the appended claims are to be considered as part of this invention.

What I claim as my invention is:

1. Electromagnetic prospecting apparatus comprising a first transmitting coil, a receiving coil, means for supporting the transmitting coil and the receiving coil a desired distance $r_1$ apart but the supporting means being subject to variations causing small changes in $r_1$, means for energizing the transmitting coil to produce a primary field of strength $H_1$ at the receiving coil, and means for compensating for unwanted changes in $H_1$ due to the small changes in $r_1$ comprising a second transmitting coil located between the first transmitting coil and the receiving coil at a distance $r_2$ from the receiving coil, the second transmitting coil being supported by the supporting means so that $r_2$ and $r_1$ have substantially the same changes, the second transmitting coil being so arranged that when energized by said energizing means it produces a compensating field $H_2$ at the receiving coil in opposition to $H_1$ and of such gradient that $$\frac{dH_1}{dr_1} = -\frac{dH_2}{dr_2}$$

2. Electromagnetic prospecting apparatus comprising an aircraft, a transmitting coil carried by the aircraft, a source of alternating current for energizing the transmitting coil to set up a primary electromagnetic field that causes a secondary electromagnetic field due to anomalies in the earth over which the aircraft flies, a bird, a tow cable connecting the bird to the aircraft, a receiving coil carried by the bird at substantially the same elevation as the transmitting coil and sensitive to the primary and secondary fields and having a voltage $V_1$ induced in it by the primary field, and means for compensating for unwanted changes in $V_1$ due to small changes in the distance $r_1$ between the transmitting coil and the receiving coil, comprising a second transmitting coil carried by the aircraft at a distance $r_2$ from the receiving coil and energized by the source of alternating current to induce a second voltage in the receiving coil in opposition to $V_1$ and of such magnitude that $$\frac{V_2}{V_1} = -\frac{r_2}{r_1}$$

$r_1$ and $r_2$ being large compared to the difference between them.

3. Electromagnetic prospecting apparatus comprising a transmitting coil, a first receiving coil, means for supporting the transmitting coil and the receiving coil a desired distance $r_1$ apart but the supporting means being subject to variations causing small changes in $r_1$, means for energizing the transmitting coil to produce a voltage $V_1$ in the output of the receiving coil, and means for compensating for unwanted changes in $V_1$ due to the small changes in $r_1$ comprising a second receiving coil located between the transmitting coil and the first receiving coil at a distance $r_2$ from the transmitting coil, the second receiving coil being supported by the supporting means so that $r_2$ and $r_1$ have substantially the same changes, the second receiving coil being so arranged that a voltage is produced in its output by the energization of the transmitting coil, of such magnitude $V_2$ that $$\frac{V_2}{V_1} = -\frac{r_2}{r_1}$$

the outputs of the receiving coils being in opposition.

4. Electromagnetic prospecting apparatus comprising an aircraft, a transmitting coil carried by the aircraft, a source of alternating current for energizing the transmitting coil to set up a primary electromagnetic field that causes a secondary electromagnetic field due to anomalies in the earth over which the aircraft flies, a bird, a tow cable connecting the bird to the aircraft, a first receiving coil carried by the bird and sensitive to the primary and secondary fields and producing an output voltage $V_1$ due to the primary field, and means for compensating for unwanted changes in $V_1$ due to small changes in the distance $r_1$ between the transmitting coil and the receiving coil, comprising a second receiving coil carried by the bird at a distance $r_2$ from the transmitting coil and so arranged that it produces an output voltage $V_2$ due to the primary field of such magnitude $V_2$ that $$\frac{V_2}{V_1} = -\frac{r_2}{r_1}$$

$r_1$ and $r_2$ being large compared to the difference between them, the outputs of the receiving coils being in opposition, and the bird carrying the receiving coils at substantially the same elevation as the transmitting coil with the axes of the receiving coils parallel to each other.

5. Electromagnetic prospecting apparatus comprising supporting means movable over the earth, first electromagnetic transmitting means carried by the supporting means to set up a primary electromagnetic field that causes a secondary electromagnetic field due to anomalies in the earth over which the supporting means moves, electromagnetic receiving means carried by the supporting means and sensitive to the primary and secondary fields and having a voltage $V_1$ produced by the primary field, and means for compensating for unwanted changes in $V_1$ due to small changes in the distance $r_1$ between the first transmitting means and the receiving means, comprising second transmitting means carried by the supporting means at a distance $r_2$ from the receiving means with $r_2$ subject to substantially the same changes as $r_1$, the second transmitting means producing in the receiving means a second voltage in opposition to $V_1$ and of such magnitude $V_2$ that $$\frac{V_2}{V_1} = -\frac{r_2}{r_1}$$

6. Electromagnetic prospecting apparatus as claimed in claim 5, wherein the supporting means hold the first and second transmitting means and the receiving means at substantially the same elevation, with $r_1$ and $r_2$ large compared to the difference between them.

7. Electromagnetic prospecting apparatus as claimed in claim 5, wherein the first transmitting means, the second transmitting means and the receiving means each comprise a coil, the coils being substantially co-axial and the supporting means being adapted to move them one behind another over the earth.

8. Electromagnetic prospecting apparatus as claimed in claim 5, wherein the first transmitting means comprise a transmitting coil having a substantially horizontal dipole vector.

9. Electromagnetic prospecting apparatus as claimed in claim 8, wherein the receiving means comprise a receiving coil having an axis substantially aligned with the dipole vector and the second transmitting means comprise a transmitting coil having an axis substantially so aligned.

10. Electromagnetic prospecting apparatus as claimed in claim 9, wherein the receiving means comprise two additional receiving coils and the three receiving coils have mutually perpendicular axes for sensing the total fields at the receiving means.

11. Electromagnetic proposecting apparatus as claimed in claim 5, wherein the first transmitting means, the second transmitting means and the receiving means each comprise a coil, the coils being arranged so that their centers are in substantially a straight line and their axes are in a substantially vertical plane and are substantially normal to said line, the supporting means being adapted to move the coils one behind another over the earth.

12. Electromagnetic prospecting apparatus as claimed in claim 5, wherein the first transmitting means comprise a transmitting coil having a substantially vertical dipole vector.

13. Electromagnetic prospecting apparatus as claimed in claim 12, wherein the receiving means comprise a receiving coil having a substantially vertical axis and the second transmitting means comprise a transmitting coil having a substantially vertical axis.

14. Electromagnetic prospecting apparatus as claimed in claim 13, wherein the receiving means comprise two additional receiving coils and the three receiving coils have mutual perpendicular axes for sensing the total fields at the receiving means.

15. Electromagnetic prospecting apparatus as claimed in claim 5, wherein the supporting means comprise a first transport body carrying the first and second transmitting means and a second transport body carrying the receiving means and movable substantially parallel to the first transport body.

16. Electromagnetic prospecting apparatus as claimed in claim 15, wherein the first and second transport bodies are connected by a tow cable in which the small changes in $r_1$ and $r_2$ largely occur.

17. Electromagnetic prospecting apparatus comprising supporting means movable over the earth, electromagnetic transmitting means carried by the supporting means to set up a primary electromagnetic field that causes a secondary electromagnetic field to anomalies in the earth over which the supporting means moves, first electromagnetic receiving means carried by the supporting means and sensitive to the primary and secondary fields and having a voltage $V_1$ produced by the primary field, and means for compensating for unwanted changes in $V_1$ due to small changes in the distance $r_1$ between the transmitting means and the receiving means, comprising second electromagnetic receiving means carried by the supporting means at a distance $r_2$ from the transmitting means with $r_2$ subject to substantially the same changes as $r_1$, the second receiving means having a voltage, produced by the primary field, in opposition to $V_1$ and of such magnitude $V_2$ that $$\frac{V_2}{V_1} = -\frac{r_2}{r_1}$$

18. Electromagnetic prospecting apparatus as claimed in claim 17, wherein the supporting means hold the transmitting means and the first and second receiving means at substantially the same elevation, with $r_1$ and $r_2$ large compared to the difference between them.

19. Electromagnetic prospecting apparatus as claimed in claim 17, wherein the transmitting means, the first receiving means and the second receiving means each comprise a coil, the coils being substantially co-axial and the supporting means being adapted to move them one behind another over the earth.

20. Electromagnetic prospecting apparatus as claimed in claim 17, wherein the transmitting means comprise a transmitting coil having a substantially horizontal dipole vector.

21 Electromagnetic prospecting apparatus as claimed in claim 20, wherein the first receiving means comprise a receiving coil having an axis substantially aligned with the dipole vector and the second receiving means comprise a receiving coil having an axis substantially so aligned.

22. Electromagnetic prospecting apparatus as claimed in claim 21, wherein the first receiving means comprise two additional receiving coils and the three receiving coils of the first receiving means have mutually perpendicular axes for sensing the total fields at the first receiving means.

23. Electromagnetic prospecting apparatus as claimed in claim 17, wherein the transmitting means, the first receiving means and the second receiving means each comprise a coil, the coils being arranged so that their centers are in substantially a straight line and their axes are in a substantially vertical plane and are substantially normal to said line, the supporting means being adapted to move the coils one behind another over the earth.

24. Electromagnetic prospecting apparatus as claimed in claim 17, wherein the transmitting means comprise a transmitting coil having a substantially vertical dipole vector.

25. Electromagnetic prospecting apparatus as claimed in claim 24, wherein the first receiving means comprise a receiving coil having a substantially vertical axis and the second receiving means comprise a receiving coil having a substantially vertical axis.

26. Electromagnetic prospecting apparatus as claimed in claim 25, wherein the first receiving means comprise two additional receiving coils and the three receiving coils of the first receiving means have mutual perpendicular axes for sensing the total fields at the first receiving means.

27. Electromagnetic prospecting apparatus as claimed in claim 17, wherein the supporting means comprise a first transport body carrying the transmitting means and a second transport body carrying the first and second receiving means and movable substantially parallel to the first transport body.

28. Electromagnetic prospecting apparatus as claimed in claim 27, wherein the first and second transport bodies are connected by a tow cable in which the small changes in $r_1$ and $r_2$ largely occur.

References Cited in the file of this patent

UNITED STATES PATENTS

| | | |
|---|---|---|
| 2,741,736 | Puranen et al. | April 10, 1956 |
| 2,919,397 | Morley | Dec. 29, 1959 |

FOREIGN PATENTS

| | | |
|---|---|---|
| 204,351 | Australia | Nov. 16, 1956 |